United States Patent
Wilson et al.

(10) Patent No.: US 8,196,856 B2
(45) Date of Patent: *Jun. 12, 2012

(54) METHOD FOR SUPPRESSING VIBRATION IN A TILTROTOR AIRCRAFT

(75) Inventors: James A. Wilson, Varese (IT); Charles L. Barkley, Jr., Fort Worth, TX (US); Gerald Smith, Jr., Grapevine, TX (US); Jeffrey B. Cloud, Mansfield, TX (US)

(73) Assignee: Textron Innovations Inc., Providence, RI (US)

( * ) Notice: Subject to any disclaimer, the term of this patent is extended or adjusted under 35 U.S.C. 154(b) by 218 days.

This patent is subject to a terminal disclaimer.

(21) Appl. No.: 12/595,295

(22) PCT Filed: Apr. 11, 2008

(86) PCT No.: PCT/US2008/004788
§ 371 (c)(1),
(2), (4) Date: Oct. 9, 2009

(87) PCT Pub. No.: WO2008/127696
PCT Pub. Date: Oct. 23, 2008

(65) Prior Publication Data
US 2010/0108822 A1 May 6, 2010

(51) Int. Cl.
*B64C 27/52* (2006.01)
(52) U.S. Cl. .................... 244/17.25; 244/56
(58) Field of Classification Search .............. 244/7 R, 244/174, 175
See application file for complete search history.

(56) References Cited

U.S. PATENT DOCUMENTS

| 2,344,967 | A | * | 3/1944 | Bennett | 244/17.23 |
| 3,368,778 | A | * | 2/1968 | Wilde et al. | 244/6 |
| 4,236,607 | A | * | 12/1980 | Halwes et al. | 188/379 |
| 4,947,356 | A | * | 8/1990 | Elliott et al. | 700/280 |
| 5,148,402 | A | * | 9/1992 | Magliozzi et al. | 700/280 |
| 5,150,855 | A | * | 9/1992 | Kaptein | 244/1 N |
| 5,305,981 | A | * | 4/1994 | Cunningham et al. | 248/550 |
| 5,453,943 | A | * | 9/1995 | Magliozzi | 700/280 |
| 5,551,649 | A | * | 9/1996 | Kaptein | 244/1 N |
| 6,227,481 | B1 | * | 5/2001 | Fenny et al. | 244/7 R |
| 6,695,106 | B2 | * | 2/2004 | Smith et al. | 188/378 |
| 6,896,219 | B2 | * | 5/2005 | Borchers et al. | 244/1 N |
| 2007/0084963 | A1 | * | 4/2007 | Nouhaud | 244/17.23 |

OTHER PUBLICATIONS

J.M. Bilger, R.L. Marr, and Ahmad Zahedi; Results of Structural Dynamic Testing of the XV-15 Tilt Rotor Research Aircraft; Presented at the 37th Annual Forum of the American Helicopter Society, New Orleans, LA, May 1981.

(Continued)

*Primary Examiner* — Timothy D Collins
*Assistant Examiner* — Michael A Fabula
(74) *Attorney, Agent, or Firm* — James E. Walton; Richard G. Eldredge

(57) ABSTRACT

A method is disclosed for suppressing vibration in an aircraft having at least one pair of multiple-blade rotors. The first step of the method is to install in the aircraft at least one pair of vibration suppression devices to form a system, the devices of each system being mounted on opposing sides of the aircraft. Then, during operation of the aircraft, the next step is to rotate the at least one pair of rotors in a manner that causes the blades one of each pair of rotors to be out of phase from the other of each pair of rotors. The final step is to use the system to suppress vibrations caused by the out-of-phase rotation of the rotors.

16 Claims, 5 Drawing Sheets

OTHER PUBLICATIONS

Office Action from Canadian counterpart Application No. 2,683,261, issued by the Canadian Intellectual Property Office on Oct. 3, 2011.

Office Action from U.S. Appl. No. 12/595,286, issued by the USPTO on Nov. 10, 2011.

* cited by examiner

■ NORMAL SHEAR
▨ VIBRATION MAGNITUDE
☐ RESULTING MOMENT

■ NORMAL SHEAR
▨ VIBRATION MAGNITUDE
☐ RESULTING MOMENT

METHOD FOR SUPPRESSING VIBRATION IN A TILTROTOR AIRCRAFT

TECHNICAL FIELD

The technical field is methods for suppression of vibration in a tiltrotor aircraft.

DESCRIPTION OF PRIOR ART

The Bell-Agusta BA609 is poised to be the world's first certified civil tiltrotor, which provides for conversion between a helicopter flight mode and an airplane flight mode. FIG. 1 is an oblique view of a BA609 tiltrotor aircraft 11, having a central fuselage 13 and wings 15 extending laterally therefrom. A nacelle 17 is pivotally mounted to the outer end of each wing 15, and each nacelle houses an engine (not shown) configured for rotating an attached multi-blade rotor 19. Nacelles 17 are shown in an intermediate angular position, which is between the horizontal position of airplane-mode, or wing-borne, flight and the vertical position of helicopter-mode, or rotor-borne, flight. Rotors 19 are counter-rotating and are shown in a symmetrically indexed configuration, in which the blades of both left and right rotors 19, which rotate in opposite directions, have the same angular orientation and operate in phase with each other. In other words, a blade of one rotor 19 passes the fuselage at the same moment as a blade of the other rotor 19.

As rotor assemblies 19 rotate during operation, vibrations are created that are transmitted from rotors 19 into wings 15 and fuselage 13. In helicopter mode flight, the BA609 demonstrates acceptable vibrations at a frequency of three cycles per rotor revolution (3/rev=28.5 Hz). However, testing has shown that as rotor speed reduces going into airplane mode the aircraft experiences significantly higher vibrations (3/rev=23.9 Hz). In particular, vibrations in the cockpit and cabin become unacceptable. The 3/rev vibrations are of primary concern because the BA609 is a three-bladed aircraft, and the strongest fixed system excitation occurs at a frequency of three times the speed of the rotor rotation.

FIG. 2 is a schematic view of aircraft 11 with the nacelles rotated into the airplane-mode flight position. Blades of rotors 19 cause lateral shear forces, which are indicated by arrows 21, 23, and these forces result in opposing and offsetting lateral vibrations, which are indicated by arrows 25, 27. Vertical shear forces are indicated by arrows 29, 31, and these forces result in vertical vibrations in the same direction, which are indicated by arrows 33, 35. Due to vibrations 33, 35 being in the same direction, vibrations 33, 35 combine to increase the magnitude of the vibrations felt in fuselage 13.

Various methods and apparatus have been suggested to reduce vibrations transmitted into the fuselage of tiltrotor aircraft during operation, but shortcomings remain.

DESCRIPTION OF THE PREFERRED EMBODIMENT

As for all rotorcraft, controlling cabin vibrations is a significant concern, and a vibration system, described herein, is designed to use vibration-suppression units (VSU) to provide localized vibration treatment for the BA609 or other tiltrotor aircraft. The VSUs may be a passive type, such as Frahm-type VSUs, may be an active type, such as electrically operated VSUs, or may be a combination of types. The VSUs are particularly effective for use with asymmetric indexing of the rotors of the aircraft.

Figure 1:
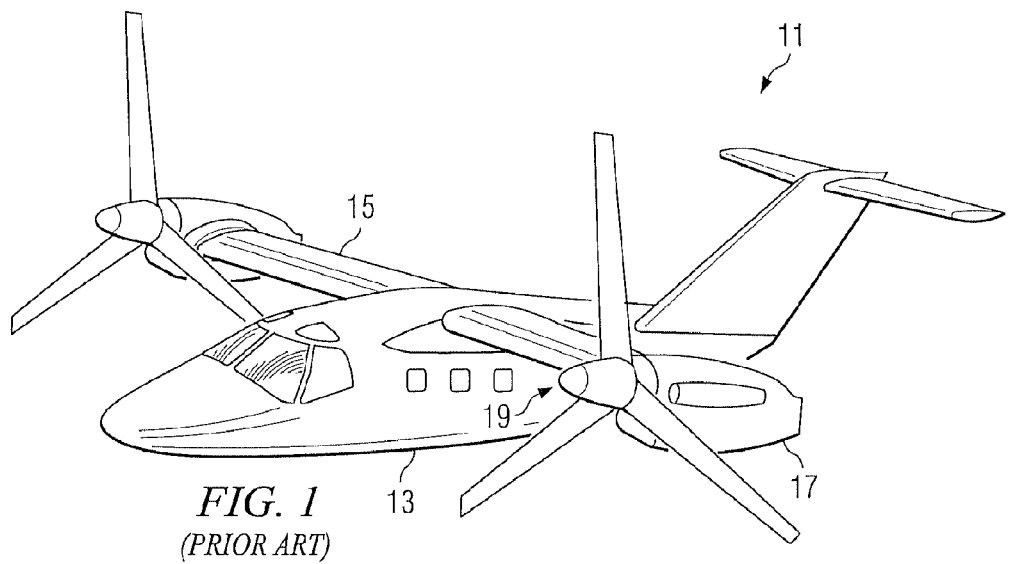
FIG. 1 is an oblique view of a prior-art tiltrotor aircraft.
Figure 2:
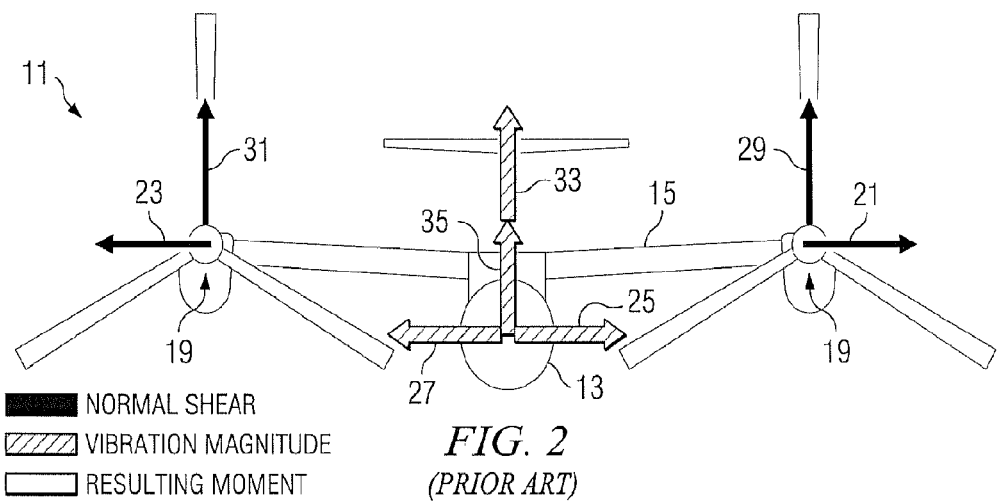
FIG. 2 is a front schematic view of a tiltrotor aircraft having a prior-art symmetric rotor configuration.
Figure 3:
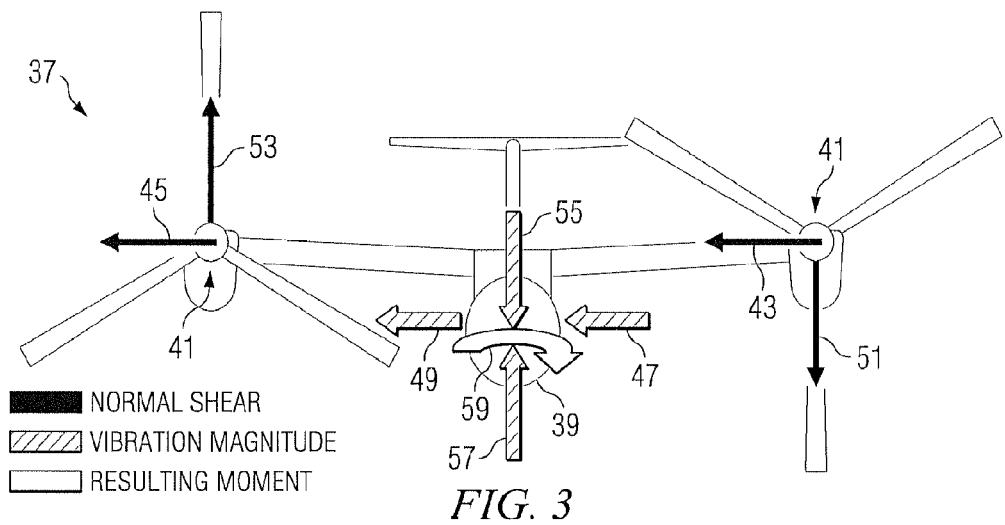
FIG. 3 is a front schematic view of a tiltrotor aircraft having an asymmetric rotor configuration.

FIG. 3 is a schematic view of a BA609 aircraft 37, which is similar in configuration and operation to aircraft 11, described above. To reduce vertical vibrations in fuselage 39 as rotors 41 counter-rotate in airplane-mode flight, rotors 41 may be asymmetrically indexed, as shown, so that the blades of the rotors are 60 degrees out of phase from each other. In other words, each blade of one rotor 41 passes the fuselage at a different time as each blade of the other rotor 41.

The 60-degree indexing for a three-blade rotor causes 180-degree phasing for the generated forces. To determine the amount of indexing required for rotors having more or fewer blades, the formula $$P(\text{indexing}) = P(\text{phasing})/N$$

Is used, wherein P(indexing) is the number of degrees that rotors having N number of blades need to be indexed relative to each other to achieve a desired P(phasing) degrees of phasing of the generated forces. For aircraft 37, the formula is calculated as $$60 \text{ degrees} = 180 \text{ degrees}/3,$$

so that the relative indexing amount between three-blade rotors 41 is 60 degrees.

Blades of rotors 41 cause lateral shear forces, which are indicated by arrows 43, 45, and these forces result in lateral vibrations, which are indicated by arrows 47, 49. Vertical 3/rev normal shear forces are indicated by arrows 51, 53, and these occur out of phase from each other. These forces result in opposing vertical vibrations, which are indicated by arrows 55, 57, that may cancel one another out as excitation sources in fuselage 39. However, due to forces 51, 53 being spaced from each other, forces 51, 53 cause a residual rolling moment about fuselage 39, as well as a residual lateral shear that could still excite asymmetric modes. Arrow 59 indicates the direction of the moment when rotors 41 are positioned as shown, but moment arrow 59 reverses direction when rotors 41 are rotated 60 degrees from the position shown in the figure.

In flight tests, re-indexing rotors 41 has been found to reduce vertical 3/rev vibrations by about one-half at all airspeeds, and vertical vibrations have also been reduced to acceptable levels. These results show that rotor indexing reduces vibrations to avoid exceeding limit levels of certain components while greatly improving the ride quality in the crew seats. Even more significant is the elegance of the re-indexing solution, in that it requires no extensive redesigns to structure or systems that would have been necessary for RPM changes or modal frequency alterations.

Figure 4:
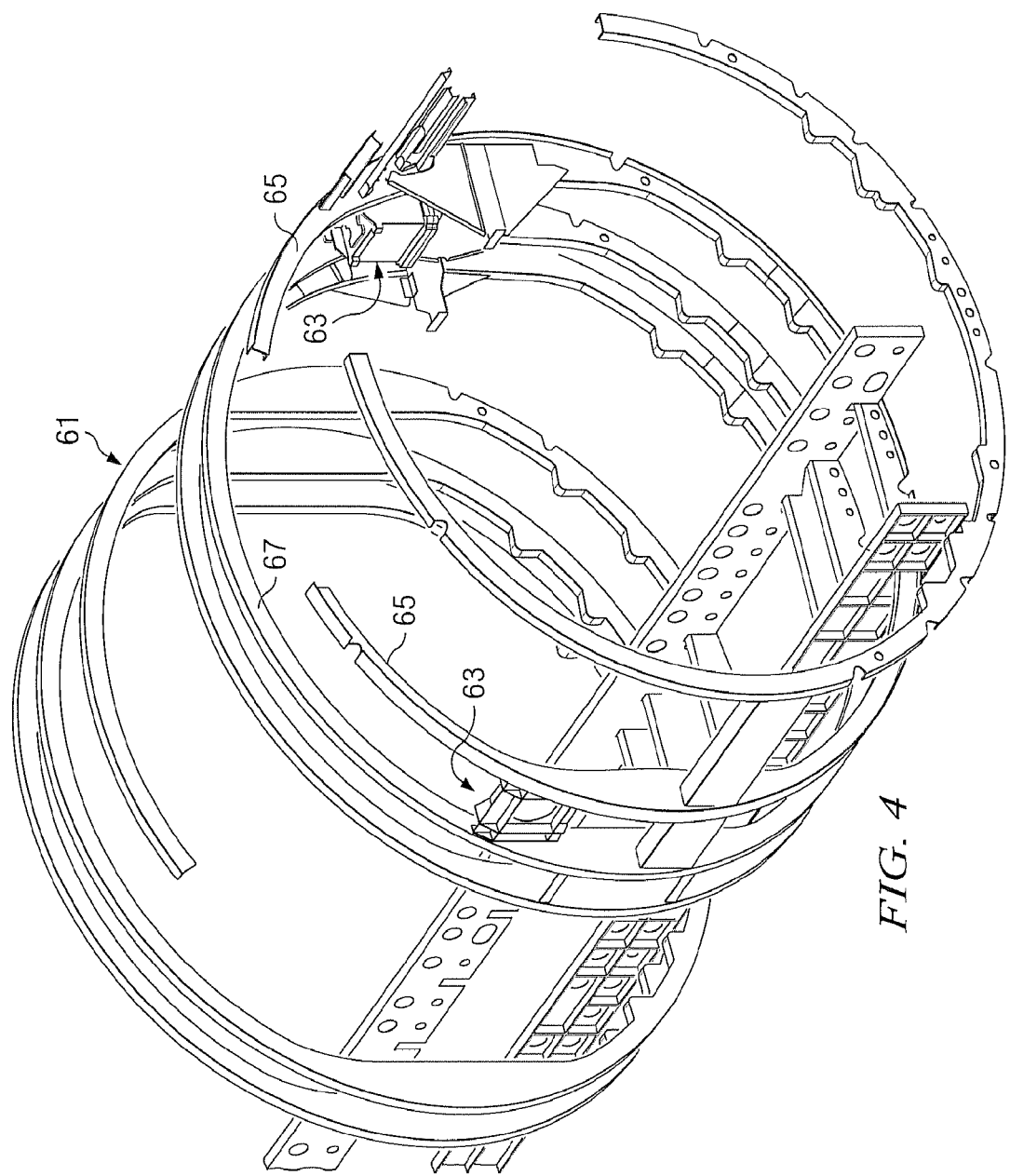
FIG. 4 is an oblique view of a portion of an airframe of the aircraft of FIG. 3, the airframe having vibration suppression apparatus installed therein.

To counteract the rolling motions and reduce remaining vertical vibrations created by the out-of-phase rotors, pairs of VSUs can be installed as a VSU system at complementary outboard positions within aircraft 37. For example, FIG. 4 shows a portion of the airframe 61 of fuselage 39. Airframe 61 has a pair of VSUs 63, together forming a VSU system, each VSU 63 being mounted to airframe 61 adjacent an aircraft wall (not shown) and between two fuselage ribs 65, 67 that extend along the circumference of fuselage 39. Preferably, VSUs 63 are located in a position that maximizes the lateral distance from the longitudinal centerline of airframe 61. While shown in a location behind and near the cockpit portion of aircraft 37, VSUs 63 may be located anywhere along airframe 61 that allows VSUs 63 to minimize undesirable vibrations.

Figure 5:
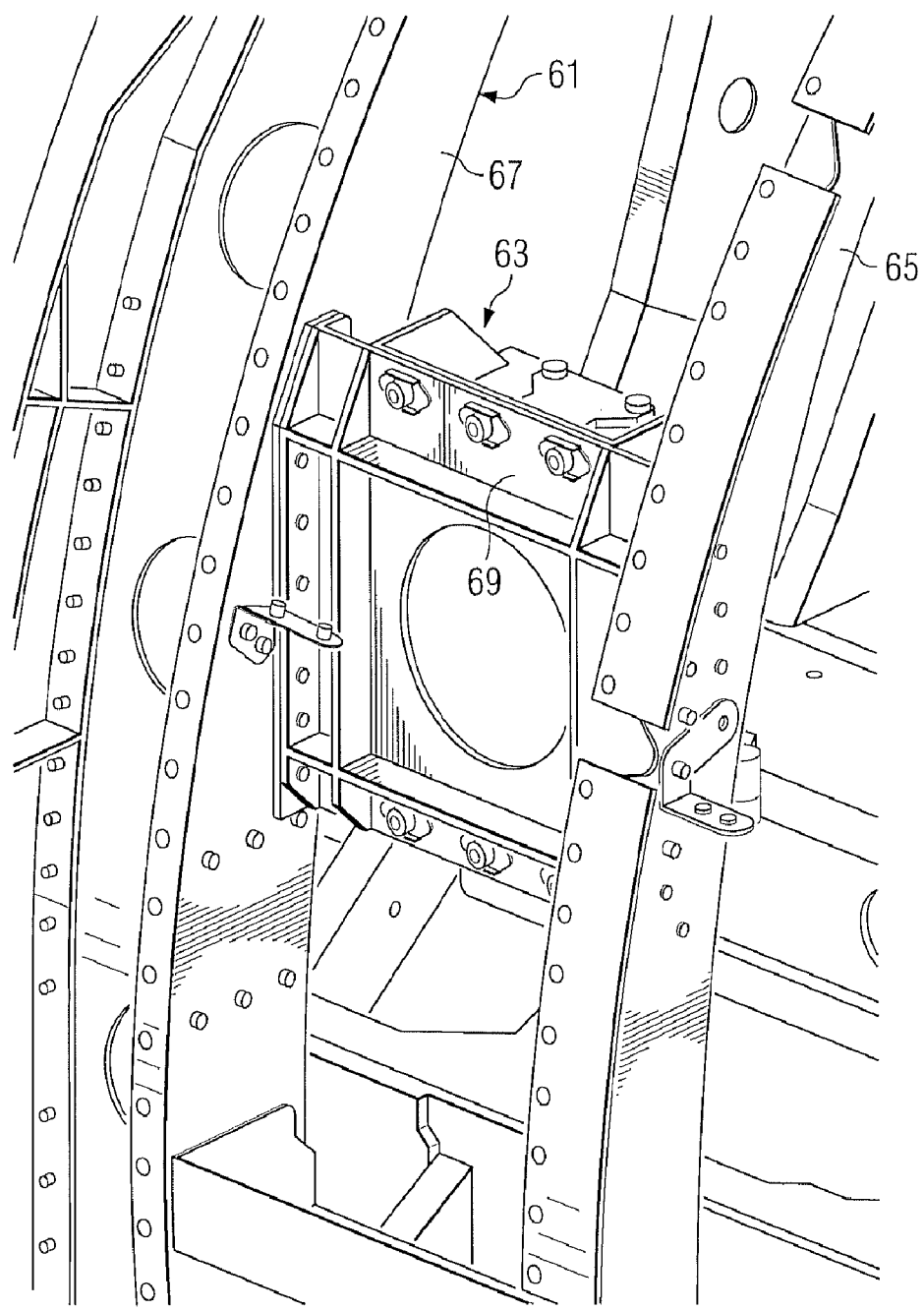
FIG. 5 is an enlarged oblique view of a portion of the airframe of FIG. 4.
Figure 6:
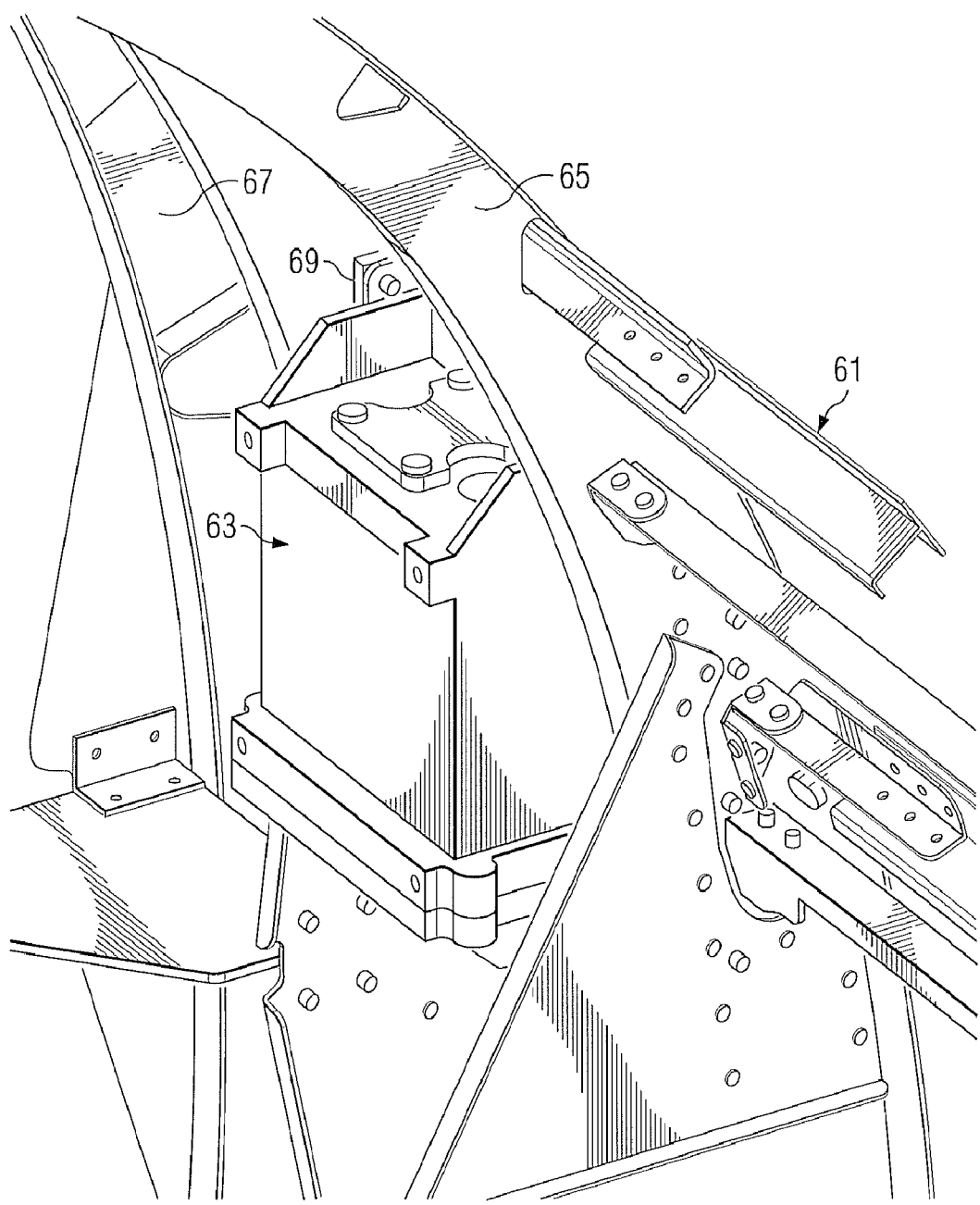
FIG. 6 is an enlarged oblique view of a portion of the airframe of FIG. 4.

FIGS. 5 and 6 are enlarged views showing the means for mounting VSUs 63 to airframe 61. FIG. 5 shows a portion of the right side of airframe 61, and FIG. 6 shows a portion of the left side of airframe 61. A mounting plate 69 is attached to and between ribs 65, 67, and a VSU 63 is mounted to each plate 69.

Figure 7:
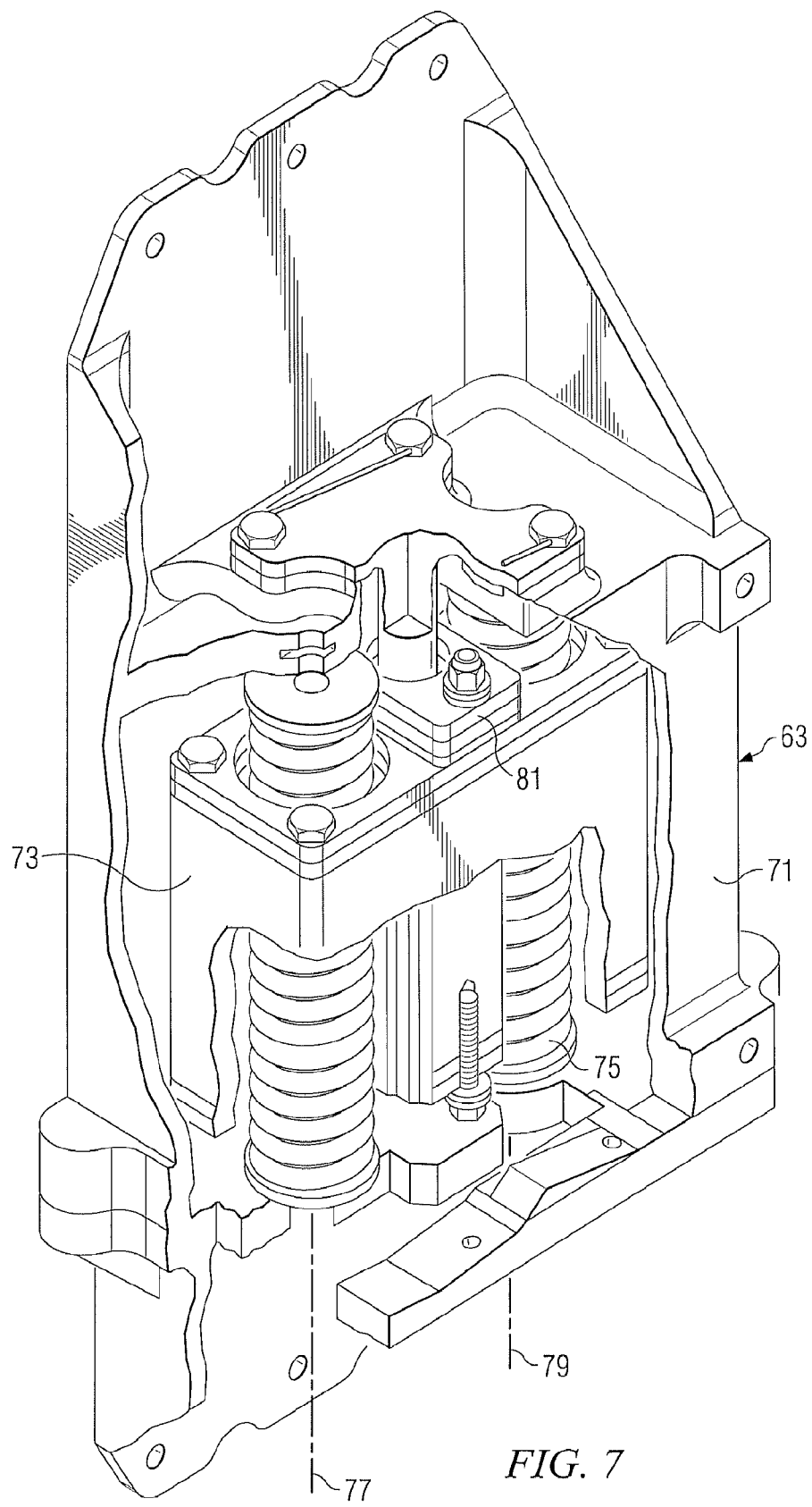
FIG. 7 is an oblique view of a vibration suppression apparatus, a portion of a housing of the apparatus being removed.

FIG. 7 illustrates one type of VSU 63 configured for use in the vibration system described above. VSU 63 is shown as a passive Frahm-type vibration suppression device, comprising a housing 71 and a body 73 carried within housing 71. Body 73 is mounted to housing 71 on springs 75, which allows body 73 and housing 71 to move relative to each other in directions parallel to axes 77, 79 of springs 75. VSU 63 is tunable for particular applications or locations by changing springs 75 or by changing the mass of body 73, such as by adding or removing tuning masses 81.

The vibration system may be optimized to achieve desired ride quality at all locations within airframe 61 and for all combinations of aircraft gross weight and altitude. For example, one or more additional systems, or paired sets, of VSUs 63 could each be mounted at a different point along the length of airframe 61 to supplement the first set. Also, an active vibrations suppression system (AVSS) could be implemented on aircraft 37. In such a system, an adaptive control algorithm and controller drives inertial force generators that may replace or supplement VSUs 63. These additional devices would be mounted at key structural points in the aircraft to suppress 3/rev vibrations for a range of operating conditions, including both helicopter- and airplane-mode flight conditions. The advantage to active devices is that they provide more vibration suppression authority and have the capability to adapt to changes in aircraft configuration, flight conditions, and gross weight.

Though shown as being attached to an airframe, it should be understood that VSUs may be attached to other portions of an aircraft, such as wall panels or auxiliary structures. In addition, it should be understood that the method disclosed may be used on types of aircraft other than tiltrotors that have one or more pairs of rotors capable of being re-indexed for out-of-phase rotation during operation.

The method described above provides for several advantages, including: (1) reduced vibrations transmitted to the fuselage of a tiltrotor aircraft; (2) ease of implementation in existing aircraft; and (3) minimal cost of implementation.

While this invention has been described with reference to at least one illustrative embodiment, this description is not intended to be construed in a limiting sense. Various modifications and combinations of the illustrative embodiments, as well as other embodiments of the invention, will be apparent to persons skilled in the art upon reference to the description.

The invention claimed is:

1. A method for suppressing vibration in an aircraft having at least one pair of non-intermeshing multiple-blade rotors, the method comprising:
   (a) locating in the aircraft at least one pair of vibration suppression devices to form a system, the devices of each system being mounted on opposing sides of the aircraft;
   (b) providing a nacelle pivotally coupled to a wing of the aircraft, being configured to pivot the rotors about the wing in relation to a fuselage;
   (c) determining the indexing angle for the at least one pair of non-intermeshing multiple-blade rotors, the rotors being indexed according to the number of blades, for achieving a phasing of generated forces exhibited in a plane parallel to that of the rotation of the blades, the forces generated from the reduction of rotor speed as the rotors pivot about the wing;
   (d) selecting a phasing angle configured to be selected in relation to the phasing of the generated force; and
   (e) indexing each non-intermeshing multiple-blade rotor prior to flight, so that the blades of one rotor are selectively indexed in relation to the blades of the other rotor, so that each rotor rotates out-of-phase to the other rotor, the indexing between each pair of rotors remains consistently out of phase during flight such that the revolutions per minute of each rotor remains constant with respect to the other rotor; and
   (f) during operation of the aircraft, using the system to suppress vibrations caused by the out-of-phase rotation of the rotors.

2. The method according to claim 1, wherein step (a) comprises locating passive-type devices.

3. The method according to claim 2, wherein the method further comprises:
   (g) tuning the passive devices to cause selected vibration suppression characteristics.

4. The method according to claim 1, wherein step (a) comprises locating active-type devices.

5. The method according to claim 4, wherein step (f) comprises operating the active devices to produce selected vibration suppression characteristics.

6. An aircraft, comprising:
   a fuselage;
   a plurality of wings extending from the fuselage;
   a nacelle mounted to each wing being configured to rotate about the wing in relation to the fuselage; and
   at least one pair of indexed non-intermeshing multiple-blade rotors coupled to the nacelle, the pair of non-intermeshing multiple-blade rotors indexed in an asymmetrical manner according to an indexing angle derived from the number of blades and a phasing angle, the indexing angle being configured to reduce vibrations of the aircraft by reducing forces generated from the reduction of rotor speed as the rotors pivot about the wing, the forces being exhibited in a plane parallel to that of the multiple-blade rotors; and
   at least one pair of vibration suppression devices located within the aircraft being configured to suppress modified vibration forces produced by the at least one pair of indexed non-intermeshing multiple-blade rotors, as compared to operably rotating in-phase rotors;
   wherein the indexing angle is determined before flight, the revolutions per minute of each rotor remaining constant with respect to the other rotor such that the indexing angle remains consistently out of phase during flight; and
   wherein each pair of vibration suppression devices suppress the modified vibration forces produced by the out-of-phase rotors.

7. The aircraft according to claim 6, wherein the vibration suppression devices are passive-type devices.

8. The aircraft according to claim 7, wherein the passive-type devices comprise:
   at least a housing, a body, and springs.

9. The aircraft according to claim 8, wherein the passive-type devices are tunable for particular applications by changing at least one of the springs and the mass of the body.

10. The aircraft according to claim 6, wherein the vibration suppression devices are active-type devices.

11. The aircraft according to claim 10, wherein the active-type devices comprise:
   at least a controller device and an adaptive control algorithm.

12. The aircraft according to claim 11, wherein the active-type devices provide an ability to adapt to changes in at least one of:
   aircraft configuration;
   flight conditions; and
   gross weight.

13. The aircraft according to claim 6, wherein each rotor has three rotor blades, the rotors being indexed at 60 degrees to each other.

14. The aircraft according to claim 6, wherein the modified vibration forces produced by the out-of-phase rotors include at least a lower level of vibration and a rolling moment.

15. The aircraft according to claim 14, wherein at least one set of vibration suppression devices suppresses the rolling moment and at least one set of vibration suppression devices suppresses the vibration.

16. The aircraft according to claim 6, wherein suppression of the modified vibration forces produced by the out-of-phase rotors improves ride quality in the aircraft.

* * * * *